United States Patent [19]
Carroll et al.

[11] Patent Number: 5,991,086
[45] Date of Patent: Nov. 23, 1999

[54] INFLATABLE OPTICAL HOUSING

[75] Inventors: David W. Carroll; James L. Carroll, both of Northfield, Minn.

[73] Assignee: ViA, Inc., Northfield, Minn.

[21] Appl. No.: 09/104,962

[22] Filed: Jun. 25, 1998

Related U.S. Application Data

[60] Provisional application No. 60/050,897, Jun. 26, 1997.

[51] Int. Cl.$^6$ .............................. G02B 27/14; G02B 1/06
[52] U.S. Cl. ............................................. 359/630; 359/667
[58] Field of Search .................................... 359/630, 667; 606/192; 623/6

[56] References Cited

U.S. PATENT DOCUMENTS

| | | | |
|---|---|---|---|
| 3,872,235 | 3/1975 | Manly, Jr. | 175/52 |
| 4,240,721 | 12/1980 | Drop, Sr. | 353/74 |
| 4,268,111 | 5/1981 | Green et al. | 350/70 |
| 4,486,079 | 12/1984 | Ueda | 350/546 |
| 4,991,222 | 2/1991 | Nixdorf | 381/188 |
| 5,123,044 | 6/1992 | Tate | 379/451 |
| 5,129,109 | 7/1992 | Runckel | 2/440 |
| 5,191,363 | 3/1993 | Smith et al. | 351/62 |
| 5,191,879 | 3/1993 | Krauter | 128/4 |
| 5,285,398 | 2/1994 | Janik | 364/708.1 |
| 5,347,400 | 9/1994 | Hunter | 359/815 |
| 5,369,415 | 11/1994 | Richard et al. | 346/6 |
| 5,406,417 | 4/1995 | Denvenyi | 359/823 |
| 5,418,642 | 5/1995 | Bende | 359/450 |
| 5,491,651 | 2/1996 | Janik | 364/708.1 |
| 5,523,890 | 6/1996 | Reaney | 359/802 |
| 5,555,490 | 9/1996 | Carroll | 361/686 |
| 5,572,401 | 11/1996 | Carroll | 361/683 |
| 5,581,492 | 12/1996 | Janik | 364/708.1 |
| 5,596,339 | 1/1997 | Furness, III, et al. | 345/8 |
| 5,798,907 | 8/1998 | Janik | 361/683 |

*Primary Examiner*—Georgia Epps
*Assistant Examiner*—Michael A Lucas
*Attorney, Agent, or Firm*—Patterson & Keough, P.A.

[57] ABSTRACT

An inflatable optical housing is adapted to provide a visual image and be used in connection with a separate computing device. The housing is sized by one or more bladders and at least one associated alignment member. Optical elements of the device provide an image of a display and/or an enhanced magnified image via lensing. The housing preferably is constructed of lightweight materials and is adapted for rapid inflation and deflation through a variety of mechanisms and with a variety of media. Embodiments of the invention are especially advantageous with wearable computing devices and methods.

24 Claims, 2 Drawing Sheets

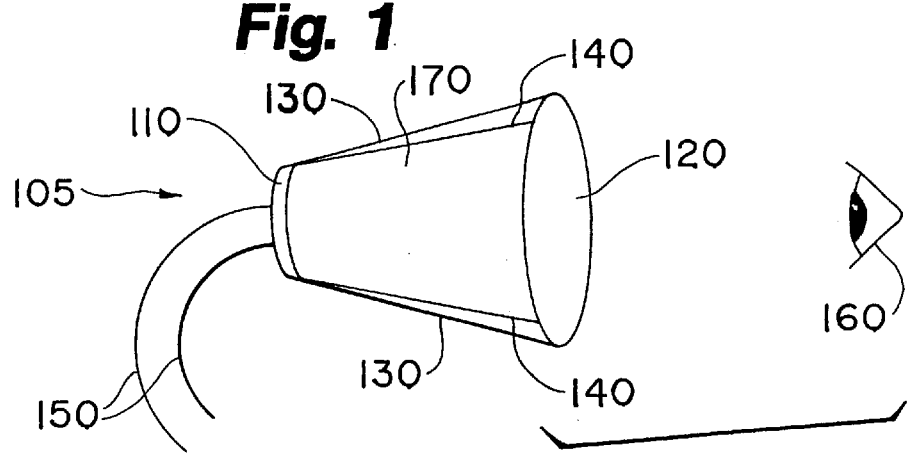
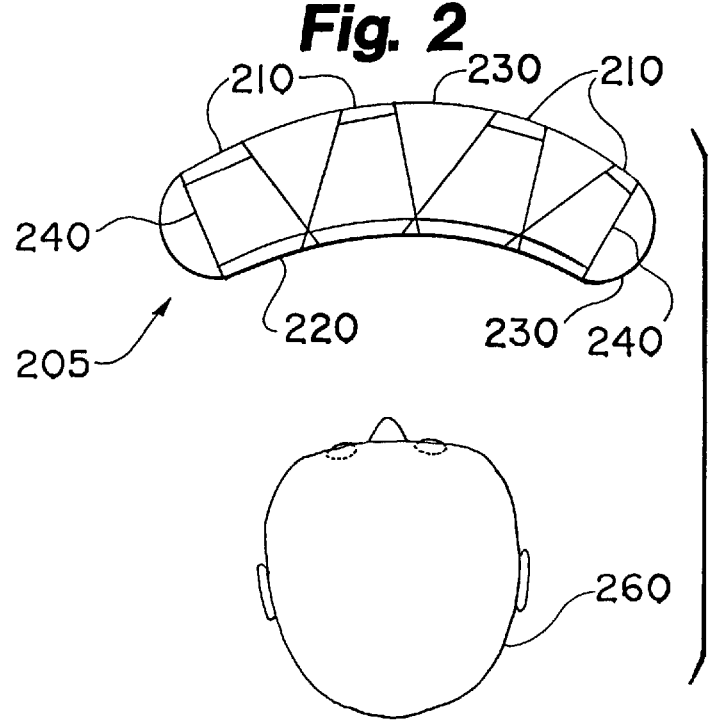
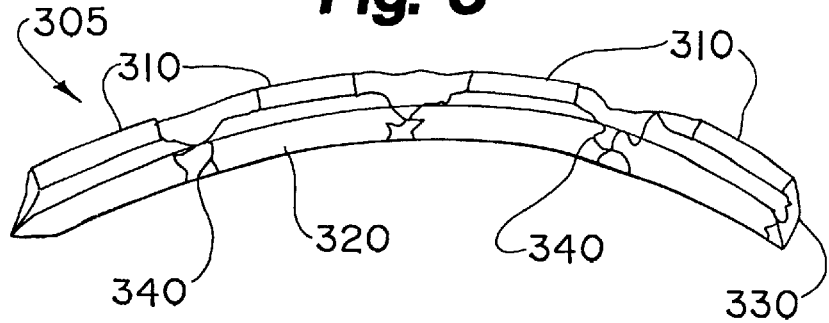

INFLATABLE OPTICAL HOUSING

CROSS-REFERENCE TO RELATED APPLICATION

This application is directed to subject matter that is related to the subject matter of commonly assigned U.S. Provisional Application Serial No. 60/050,897, filed Jun. 26, 1997, priority to which is claimed under 35 U.S.C. § 119(e), and which is incorporated herein by reference in its entirety.

BACKGROUND OF THE INVENTION

1. Field of the Invention

This invention relates to optical assistance devices, for example those designed to be worn by a human user, and more particularly to such devices that are containable within a lightweight, compact, inflatable housing and are suitable for use in varied applications and environments.

2. Description of Related Art

Wearable computing devices of many different types are being used in a host of commercial, industrial and consumer environments and have enormous use-potential in a number of marketplaces, including the military and commercial marketplaces. Commercially, the growth of wearable/portable computing technology is being fueled by phone, pager, wireless local area network (LAN) and other options. Markets for wearable computing devices include manufacturing, police, fire, medical, elder care, transportation, distribution, retailing, and others where hands-free computing allows unimpeded hands-on work. Potential military uses include communications, sensing, imaging, maintenance, inspection, security, intelligence, and medical-related tasks. Many computers on the market presently are brick-like, however, concentrating a great deal of weight in a bulky, cumbersome box that must be strapped onto the body.

The best wearable computers are lightweight and flexible, demonstrating superior ergonomics and allowing use during all normal activities. According to one example, flexible circuitry or equivalent flexible transmission devices join physically independent computer modules, allowing comfortable distribution of the computer about the body to accommodate a wide variety of body morphologies. Standard-interconnect input/output devices allow easy user upgrades and modular replacements. Spread-spectrum wireless LANs allow interaction with other users, a host computer system, or both. Flexible wearable computing devices are comfortable, easy-to-use, convenient and powerful alternatives to the brick-like machines that until recently have been the only choice in the marketplace.

Commonly assigned U.S. Pat. Nos. 5,285,398, 5,491,651 and 5,581,492 to Janik, and commonly assigned U.S. Pat. Nos. 5,555,490 and 5,572,401 to Carroll, all of which are incorporated by reference herein, disclose a number of extremely advantageous designs that are expected to dominate over previous, brick-like wearable computers.

U.S. Pat. No. 5,523,890, granted to Reaney on Jun. 4, 1996, addresses the issue of wearable computing devices in the context of virtual reality technology. Reaney discloses a visual magnifier for use with a video display screen that can be mounted on the head. The screen is coupled to a rigid housing wherein the side surfaces are parallel to the front and the rear surfaces. U.S. Pat. No. 5,191,879, granted to Krauter on Mar. 9, 1993, discloses a rigid borescope or endoscope probe equipped with a camera or imaging device. The device allows for variable focus of the camera by means of a braid and bladder assembly capable of axial expansion. The assembly, however, is incapable of radial expansion. U.S. Pat No. 5,406,417, granted to Denvenyi on Apr. 11, 1995, discloses an optical device equipped with a pneumatic adjusting mechanism to enable the user to make changes to a focal length. The entire device is not adapted for collapsibility because the outer frame is constructed of rigid metal parts. All of the previously mentioned patents are incorporated herein by reference. None of the patents teach or disclose placing a device that is compatible with a wearable computing device within a collapsible housing.

Given the many opportunities that have arisen with the introduction of these technologies, it would be very advantageous to further develop, improve and specifically adapt these technologies to optical devices for use in wearable-computing environments, specifically wherein the device housing is adapted for collapsibility.

SUMMARY OF THE INVENTION

The present invention provides a collapsible optical housing adapted for use with a wearable computing device. According to one embodiment, the assembly comprises a pair of optical elements, comprising a lens and a display monitor, to provide a visual image on a display monitor. A set of alignment cords are coupled to the optical elements and are further coupled to one or more bladders. The bladders are inflatable and operate to substantially define the dimensions of the housing, limited by the length of the set of alignment cords. The assembly is adapted to be worn by a human and used in conjunction with a separate wearable computing device.

In a further embodiment of the invention, the assembly comprises a pair of lenses separated by a set distance and aligned in a substantially parallel orientation. A plurality of alignment cords are attached to and extend between the two lenses. One or more inflatable bladders coupled to the alignment cords may be inflated to varying degrees, but not extending beyond the length of the non-extendible alignment cords. In this embodiment, the lenses are adapted to provide a magnified image to the human eye and may be used in conjunction with a wearable computing device.

BRIEF DESCRIPTION OF THE DRAWINGS

FIG. 1 is a side view of an embodiment of the invention providing a lens and a display monitor for viewing.

FIG. 2 is a top view of an embodiment of the invention adapted for placement about the human head and providing a wide-angled view display.

FIG. 3 is a view of an embodiment of the invention in a collapsed or deflated state.

DETAILED DESCRIPTION OF PREFERRED EMBODIMENTS

Figure 4:
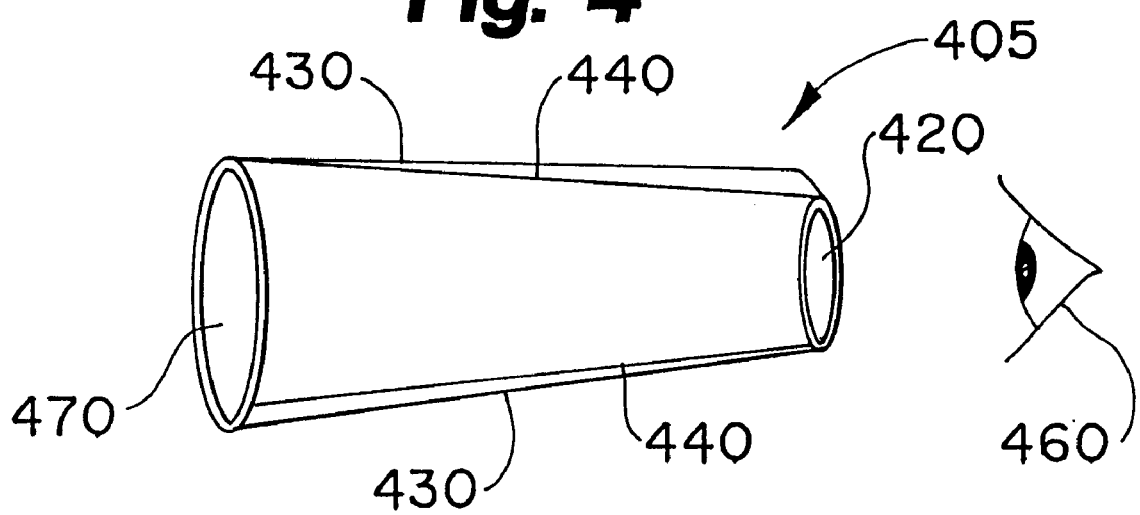
FIG. 4 is a side view of an embodiment of the invention equipped with a pair of lenses for providing a magnified visual image for viewing.

Embodiments of the invention provide an apparatus and method for providing at least one visual image for viewing by a human eye or eyes. A collapsible optical housing generally provides a substantially fixed separation distance between a display and associated lensing, between two sets of lensing, or between any two or more optical elements. According to embodiments of the invention, the apparatus is adapted for use with a variety of wearable computing devices and in other environments where portability and durability are desirable and/or necessary. Embodiments of the invention are exceptionally lightweight, compact and capable of being compressed or deflected to a smaller size when not in use. Embodiments of the invention can take the form of a computer or television display monitor, or monitors, for example, as well as field glasses, telescopes, and/or other optical devices.

Referring to FIG. 1, unit 105 includes an optical element, or display, 110, comprising, e.g., a computer or television display, spaced a distance from another optical element, e.g., one or more lenses or their functional equivalent (hereinafter lensing) 120, by one or a plurality of inflatable bladders 130 and one or more alignment members, e.g., cords 140 or bladder material which acts as an alignment member. Leads 150 depend from display 110 for coupling to a separate computing device, according to this embodiment. Wireless, fiber optic, and other modes of data transmission are also contemplated.

Display 110 may be a single element spanning the width of unit 105 or may comprise multiple displays 110. In either case, display 110 operates in connection with lensing 120, which too may comprise single or multiple elements depending on the particular application. A preferred maximum distance between display 110 and lensing 120 is determined by the one or more alignment cords 140 that are operatively coupled to display 110, lensing 120, and at least one bladder 130.

Bladder 130 preferably has a dual-wall construction and provides a support framework between display 110 and lensing 120. The support framework preferably extends from the outer edges of display 110 to the outer edges of lensing 120 to create hollow space 170 in between. According to one embodiment, a preferably opaque material such as cloth or MYLAR covers or forms bladder 130, to substantially prevent encroachment of ambient light and thereby enhance visibility of display 110. Alternatively, light may be controlled or restricted to directly strike display 110 and encroach upon space 170 and bladder 130, for instance when display 110 comprises a highly reflective operating screen which utilizes ambient light as opposed to back light. Bladder 130, the covering material, or both further operate to substantially protect display 110, lensing 120, and other associated elements from the deleterious effects of dust, moisture, and other contaminants.

According to an alternative embodiment, bladder 130 may have a single-wall construction. Therein, bladder 130 can extend between display 110 and lensing 120, e.g., all the way around their respective outer edges, such that space 170 between display 110 and lensing 120 is filled with and emptied of an inflation medium. It is believed that the previous embodiment, utilizing a dual-walled bladder 130 construction for accommodating the inflation medium, provides more benefit; nonetheless, in particular applications, a single-wall bladder 130 design may be preferable.

Figure 5:
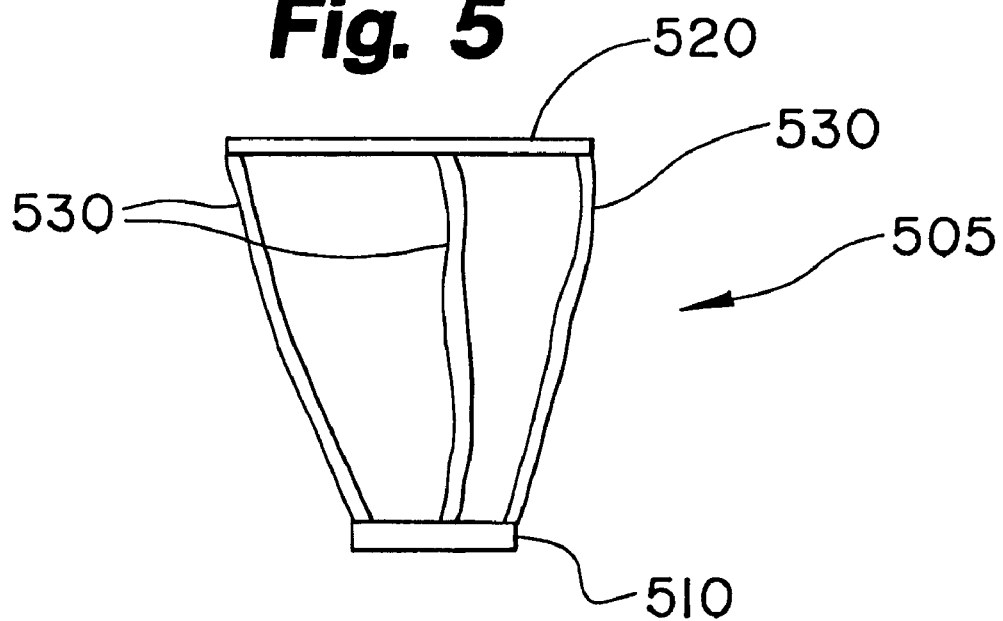
FIG. 5 is a top view of an embodiment of the invention providing hollow inflatable tubes as the support framework.

Alignment cords 140 preferably are substantially non-stretchable, providing a substantially fixed and determinable maximum separation distance between display 110 and lensing 120. Cords 140 are pliant in that they may be altered to varied configurations, particularly when unit 105 is not in use; however, cords 140 cannot be stretched substantially beyond their normal fully extended length. As bladder 130 is inflated, the distance between display 110 and lensing 120 increases until cords 140 are pulled taut. Thus, cords 140 function to prevent over-inflation of bladders 130 and any associated excessive distance between display 110 and lensing 120, or over-sizing of unit 105. The length of cords 140 can be chosen to effect a desired separation distance depending upon the types of display 110 and lensing 120 utilized for the application. Alignment cord 140 length may also be selected to accommodate different focal lengths, preferences or needs associated with the eyes 160 of a user, for instance, an eyeglasses prescription, and a host of other variables. Alternatively, cords 140 may be inflatable tubes, optionally combining bladder 130 and cord 140 functions into a unitary component, as pictured in FIG. 5, wherein unit 505 comprises display 510, lensing 520, and tubes 530.

In one embodiment, display 110 is a single small display element currently available from various manufacturers, for example Kopin Corporation. Display 110 can be, for example, a ⅝ inch 640×480 VGA screen. It is anticipated that a wide variety of displays 110, either available now or in the near future, are suitable for use in unit 105, for example, light emitting polymer (LEP) displays manufactured by Cambridge Display Technology, Ltd. Lensing 120 can be made from a variety of lensing materials available on the market presently, or in the future. Lensing 120 is preferably constructed of lightweight, scratch-resistant and durable materials to accommodate a wide range of harsh environments, including adaptation for portability. Bladder 130 is preferably formed of any suitable flexible material. According to one embodiment, eight reinforcing bladders 130 are used, wherein bladders 130 are each filled from a single pump. Alternatively, multiple pumps or other inflation/deflation devices may be utilized on bladders 130. Of course, other numbers of bladders 130 are also contemplated by the invention. Cords 140 are preferably constructed of semi-rigid cable, wire, monofilament, MYLAR strip, air tube, or other equivalent or similar material preferably characterized by a lightweight construction. Cords 140 are positioned about unit 105 separate from bladder 130. The invention contemplates varied configurations wherein cords 140 are placed inside of, outside of, or adjacent to bladder 130. In an alternate embodiment, cords 140 can be integrated with bladder 130. With an outer covering material such as MYLAR, and lightweight cords 140, display 110 and lensing 120 make up the vast majority of the weight of the unit 105.

Particular embodiments of the invention can further be used in conjunction with wearable computing devices in a wide variety of configurations, including pocketed, belt-mounted, hand-held, body-worn and heads-up device and display configurations. In each embodiment, the configuration and structure of unit 105 is designed to minimize obtrusiveness to the user. Wired or wireless links between unit 105 and the remainder of the wearable computer are contemplated, for example fiber optic, infrared, radio frequency and other video/data transmitters available now or in the future. Linkage between unit 105 and the wearable computer is accomplished via leads 150. Unit 105 may also be used as a mount for other interface features, including audio exchange interfaces, such as speakers, microphones, or microphone/speaker combinations. Additionally, unit 105 can be disposable after a single use or single-use event or, alternatively, can be reusable multiple times in multiple environments.

In yet another embodiment of the invention, display 110, a liquid crystal display, for example, is utilized to generate a visual image that is projected directly onto the retina of the user's eye. Optionally, the invention may incorporate retinal scan devices. The image may be in black-and-white or may be colorized. Based on characteristics of unit 105, such as cords 140 and bladders 130, the focal length may be adjusted to provide an acceptable view to the user. Further, the image can be directed onto the retina of both eyes to provide a three-dimensional image for the user. See U.S. Pat. Nos. 5,596,339 and 5,369,415, for example, which are incorporated herein by reference, for examples of systems potentially usable according to embodiments of the invention.

Referring now to FIG. 2, unit 205 comprises a plurality of displays 210 and lensing 220, operatively coupled to at least one bladder 230 and alignment cords 240. Displays 210 can be used in operative connection with lensing 220 to create a wide-angled view display for viewing by user 260. Displays 210 can be adjacent one another or, alternatively, separated by a predetermined distance. Lensing 220 can be formed of single or multiple elements that can be adjacent to or separated from one another in a manner similar to that of displays 210. In this embodiment, cords 240 are eight in number and form a criss-cross pattern, as illustrated. Of course, a single cord 240, or any other number of cords 240, can be used to match the requisite considerations of unit 205, including, but not limited to, size and intended use. Cords 240 can extend between the top, bottom and side surfaces, any combination thereof, or any other portions of displays 210 and lensing 220 or their associated elements, to substantially fix the desired separation distance. The optical pattern may be spherical in nature, rather than linear, e.g., display 210 may extend or wrap up and down, as well as extend or wrap around laterally.

Unit 305, as illustrated in FIG. 3, is adapted to collapse easily, by a method of deflation, into a "platter" or other shape, with a footprint or surface area profile no larger than displays 310 or lensing 320. According to one embodiment, unit 305, which comprises displays 310, lensing 320, bladders 330, and cords 340, folds like a spiral coin purse, collapsing into a substantially flat space in a number of different ways. Rapid inflation and deflation are contemplated so that unit 305 can readily be mounted onto a belt or holster, for example with a hook and loop-type fastener, and quickly moved to and from positions of use. A wide variety of devices and mechanisms, such as pumps and compressed gas, as well as manual inflation/deflation are contemplated. Similarly, a wide variety of inflation mediums are contemplated, including, but not limited to, ambient air, helium, argon, and other varieties of suitable gaseous matter.

In a further embodiment of the invention, as illustrated in FIG. 4, unit 405 comprises lensing 420, bladders 430, alignment cords 440, and lensing 470 that collectively provide a visual image to be viewed by a human eye or eyes 460. As stated, in this embodiment, the display present in other embodiments is replaced with lensing 470, creating a field-glasses or telescopic-type device. Bladders 430 and cords 440 are substantially similar to those previously described hereinabove, affording similar or identical advantages in terms of weight, collapsibility, and portability. The separation distance between lensings 420 and 470 may be more critical in this embodiment; but this and all other embodiments of the invention can provide a substantially known, substantially fixed separation distance as needed.

While the present invention has been described and illustrated with reference to particular preferred embodiments, the invention is not limited to the specific optical elements or examples given. For instance, units according to the invention can be used in a wide variety of wearable-computing and many other varied environments, including, but not limited to, military, manufacturing, and commercial applications. Various other modifications will occur to those of ordinary skill, and other embodiments and modifications can be made by those skilled in the art without departing from the spirit and scope of the invention as defined in the following claims.

What is claimed is:

1. A collapsible optical housing comprising:
   at least one optical element;
   at least one alignment member having a proximal end and a distal end, the proximal end of the alignment member being operatively coupled to and extending from the optical element;
   lensing operatively coupled to the distal end of the alignment member, the lensing positioned substantially parallel to the optical element; and
   at least one inflatable bladder for filling with an inflation medium, the inflatable bladder being operably coupled between the optical element and the lensing, wherein inflation of the inflatable bladder separates the optical element and the lensing until the alignment member substantially sets the distance between an optical element and the lensing; further wherein deflation of the inflatable bladder allows the optical housing to collapse.

2. The housing of claim 1, wherein the alignment member comprises an alignment cord constructed of a substantially non-extendible material.

3. The housing of claim 1, wherein the alignment member comprises a plurality of alignment cords, the alignment cords being adapted to provide a predetermined distance between the optical element and the lensing.

4. The housing of claim 1, wherein the optical element is selected from the group consisting of a display device and a lens.

5. The housing of claim 1, wherein the alignment member and the bladder are constructed as a unitary component.

6. The housing of claim 1, wherein the alignment member is constructed of a material selected from the group consisting of a rigid cable, a wire, a monofilament, a MYLAR strip, and an air tube.

7. The housing of claim 1, wherein the at least one bladder comprises a plurality of bladders to provide a support framework between the optical element and the lensing.

8. The housing of claim 1, wherein the at least one optical element comprises a plurality of optical elements, the optical elements being separated by a set distance; further wherein the lensing comprises a plurality of lenses operatively coupled together; further wherein the housing is adapted to provide a wide-angle view or spherical display.

9. The housing of claim 1, wherein the at least one bladder comprises at least one dual-walled bladder adapted for inflation and deflation from an at least one pump.

10. The housing of claim 1, wherein the at least one bladder comprises an opaque covering adapted to substantially impede transmission of ambient light to the optical element.

11. The housing of claim 1, wherein the housing restricts and directs light about a highly reflective display.

12. The housing of claim 1, wherein the at least one bladder comprises a covering to reduce particulate contamination.

13. The housing of claim 1, wherein the housing collapses to a small profile defined by the cross-sectional area of the optical element and the lensing.

14. The housing of claim 1, wherein the housing is constructed for operative connection to a wearable computing device.

15. The housing of claim 1, wherein the optical element comprises lensing; further, wherein the housing comprises a telescopic device.

16. The housing of claim 1, wherein the optical element comprises lensing; further, wherein the housing comprises a field glasses device.

17. An inflatable optical housing constructed for operative connection with a computer system, the housing comprising:
   optical means for providing a visual image; and
   positioning means for displacing the optical means with an inflation medium, the positioning means being operatively coupled to the optical means.

18. The housing of claim 17, wherein the housing is constructed as a single use, disposable device.

19. The housing of claim 17, wherein the optical means comprises:
   a display; and
   a lens operatively coupled to the display;
   wherein the display and the lens function to provide a magnified visual image.

20. The housing of claim 17, wherein the positioning means comprises:
   a plurality of substantially non-extendible cords adapted to maintain a substantially fixed distance between the display and the lens.

21. The housing of claim 17, further comprising means for projecting the visual image directly onto a retina of at least one eye of a user.

22. A method of providing a visual image via an inflatable optical device, the method comprising:
   operatively coupling a plurality of optical elements with a bladder; and
   inflating the bladder to a predetermined dimension to enable focusing of the optical elements.

23. The method of claim 22, further comprising the step of impeding the incidence of ambient light upon at least one of the plurality of optical elements.

24. The method of claim 23, wherein the inflatable optical device is adapted for use with a wearable electronics system.

* * * * *